US008650545B2

(12) United States Patent
Dybas

(10) Patent No.: US 8,650,545 B2
(45) Date of Patent: Feb. 11, 2014

(54) FILE CREATION UTILITY FOR DEDUPLICATION TESTING

(75) Inventor: Richard Scott Dybas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1159 days.

(21) Appl. No.: 12/369,470

(22) Filed: Feb. 11, 2009

(65) Prior Publication Data

US 2010/0205158 A1 Aug. 12, 2010

(51) Int. Cl.
*G06F 11/36* (2006.01)

(52) U.S. Cl.
USPC .......................................... 717/126; 717/124

(58) Field of Classification Search
USPC .......................................... 717/126; 707/692
See application file for complete search history.

(56) References Cited

U.S. PATENT DOCUMENTS

| 7,278,135 | B2 | 10/2007 | Czerwonka | |
|---|---|---|---|---|
| 7,287,019 | B2 | 10/2007 | Kapooer et al. | |
| 7,853,750 | B2 * | 12/2010 | Stager | 711/112 |
| 7,984,026 | B2 * | 7/2011 | Iitsuka | 707/692 |
| 2006/0126725 | A1 * | 6/2006 | Zeng et al. | 375/240.03 |
| 2009/0271454 | A1 * | 10/2009 | Anglin et al. | 707/204 |
| 2010/0205020 | A1 * | 8/2010 | Losey | 705/7 |

OTHER PUBLICATIONS

Vatolin et al., "MPEG-4 AVC/H.264 Video Codecs Comparison", Third Annual MSU MPEG-4 AVC/H.264 Video Codec Comparison, Nov. 2006, Retrieved May 21, 2013.*
"Deduplication Comparison Results"—FEBRL, QS Technologies, a Netsmart Technologies Company, 2003-2006, 14 pages.
Peter Christen et al., "A Probabilistic Deduplication, Record Linkage and Geocoding System," http://datamining.anu.edu.linkage.html, Proceedings of the ARC Health Data Mining workshop, University of South Australia, Apr. 2005, 12 pages.

* cited by examiner

*Primary Examiner* — Li B Zhen
*Assistant Examiner* — Joanne Macasiano
(74) *Attorney, Agent, or Firm* — Griffiths & Seaton PLLC

(57) ABSTRACT

A method, system, and computer program product for facilitating deduplication product testing in a computing environment is provided. At least one deduplication test file is generated. The at least one deduplication test file is adapted for, when processed through the deduplication product testing, exhibiting a predefined deduplication factor. A definition file is initialized. The definition file defines at least one file characteristic addressed during the generating the at least one deduplication test file to obtain the predefined deduplication factor. The file characteristic may include a file pattern, a file/pattern ratio, and a pattern across multiple files.

14 Claims, 3 Drawing Sheets

FILE CREATION UTILITY FOR DEDUPLICATION TESTING

BACKGROUND OF THE INVENTION

1. Field of the Invention

The present invention relates in general to computers, and more particularly to apparatus, method and computer program product embodiments for facilitating deduplication product testing in a computing environment.

2. Description of the Related Art

Computers and computer systems are found in a variety of settings in today's society. Computing environments and networks may be found at home, at work, at school, in government, and in other settings. Computing environments increasingly store data in one or more storage environments apart from the interface that computer users typically associate. In many cases, the storage environments are located across wide area networks (WANs), in which data is sent to/received from a storage system located remotely from the host.

In some situations, data storage is provided locally and also provided to a remote storage environment to enhance data security by providing redundancy. In these situations, several instances of data may be stored in multiple locations. While this scenario provides for failsafe recovery in the event of data loss at one location, the maintenance of a number of redundant copies expends resources, such as consuming network bandwidth.

To combat this issue, data deduplication mechanisms are being implemented in greater frequency. Data deduplication refers to the elimination of redundant data. In the deduplication process, duplicate data is deleted, leaving only one copy of the data to be stored. However, indexing of all data is still retained should that data ever be required. Deduplication mechanisms reduce the required storage capacity since only the unique data is stored.

SUMMARY OF THE INVENTION

Computer components, software and hardware, require testing to validate and/or verify performance. Accordingly, deduplication mechanisms are tested to determine if a file processed through these deduplication mechanisms exhibits various deduplication factors, such as particular deduplication ratios. Currently, however, a utility to create data (e.g., multitudes of files) that have known deduplication properties that can be used to test and/or measure performance of existing and future products that use deduplication as part of their processing is nonexistent. It is difficult to measure overall product performance without an ability to measure against files having a variety of predefined, standardized deduplication properties, such as deduplication ratios.

In view of the above, a need exists for a utility to create multitudes of files having a variety of predefined, standardized deduplication properties for product testing. Accordingly, in one embodiment, by way of example only, a method for facilitating deduplication product testing in a computing environment by a processor in communication with a memory device is provided. At least one deduplication test file is generated. The at least one deduplication test file is adapted for, when processed through the deduplication product testing, exhibiting a predefined deduplication factor.

In another embodiment, again by way of example only, a utility for facilitating deduplication product testing in a computing environment by a processor in communication with a memory device is provided. A deduplication module is associated with the processor and memory device in the computing environment. The deduplication module is adapted for generating at least one deduplication test file. The at least one deduplication test file is adapted for, when processed through the deduplication product testing, exhibiting a predefined deduplication factor.

In still another embodiment, again by way of example only, a computer program product for facilitating deduplication product testing in a computing environment by a processor in communication with a memory device is provided. The computer program product comprises a computer-readable storage medium having computer-readable program code portions stored therein. The computer-readable program code portions include a first executable portion for generating at least one deduplication test file, wherein the at least one deduplication test file is adapted for, when processed through the deduplication product testing, exhibiting a predefined deduplication factor.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide mechanisms for facilitating deduplication product testing in a computing environment. These mechanisms use a highly customizable definition file to create multitudes of deduplication test files. When these deduplication test files are processed through testing of a particular deduplication product, each of the files exhibits one or more predefined, standardized deduplication factors. As a result, the illustrated embodiments enable objective deduplication product testing using a variety of files having standardized factors (such as factors in varying intensity or degree). These standardized deduplication factors may describe a variety of deduplication characteristics, such as the degree of data reduction, the quality of the deduplicated file, or a computer resource allocation associated with performing the data deduplication.

In one example, a deduplication factor for a particular deduplication test file may characterize the degree of data reduction using a certain deduplication ratio. The term "deduplication ratio" as used herein refers to a ratio of data before deduplication to the amount of data after deduplication. A higher deduplication ratio corresponds to a higher amount of data reduction. Accordingly, in an implementation where the standardized deduplication factor is a certain deduplication ratio, the deduplication test file exhibits the deduplication ratio when the file is processed through a product-testing environment.

The deduplication test file may be packaged into a deduplication fileset. This deduplication fileset may be provided to one or more testing environments. The testing environments may be local, or as the skilled artisan will appreciate, the testing environments may involve deduplication product testing in computing environments located remotely from a local site. As the skilled artisan will appreciate, the computing environments may include one or more computers connected over various networks. In whichever computer architecture is implemented, use of a fileset of deduplication test files having a variety of standardized deduplication factors allows for the objective gathering of data points.

Figure 1:
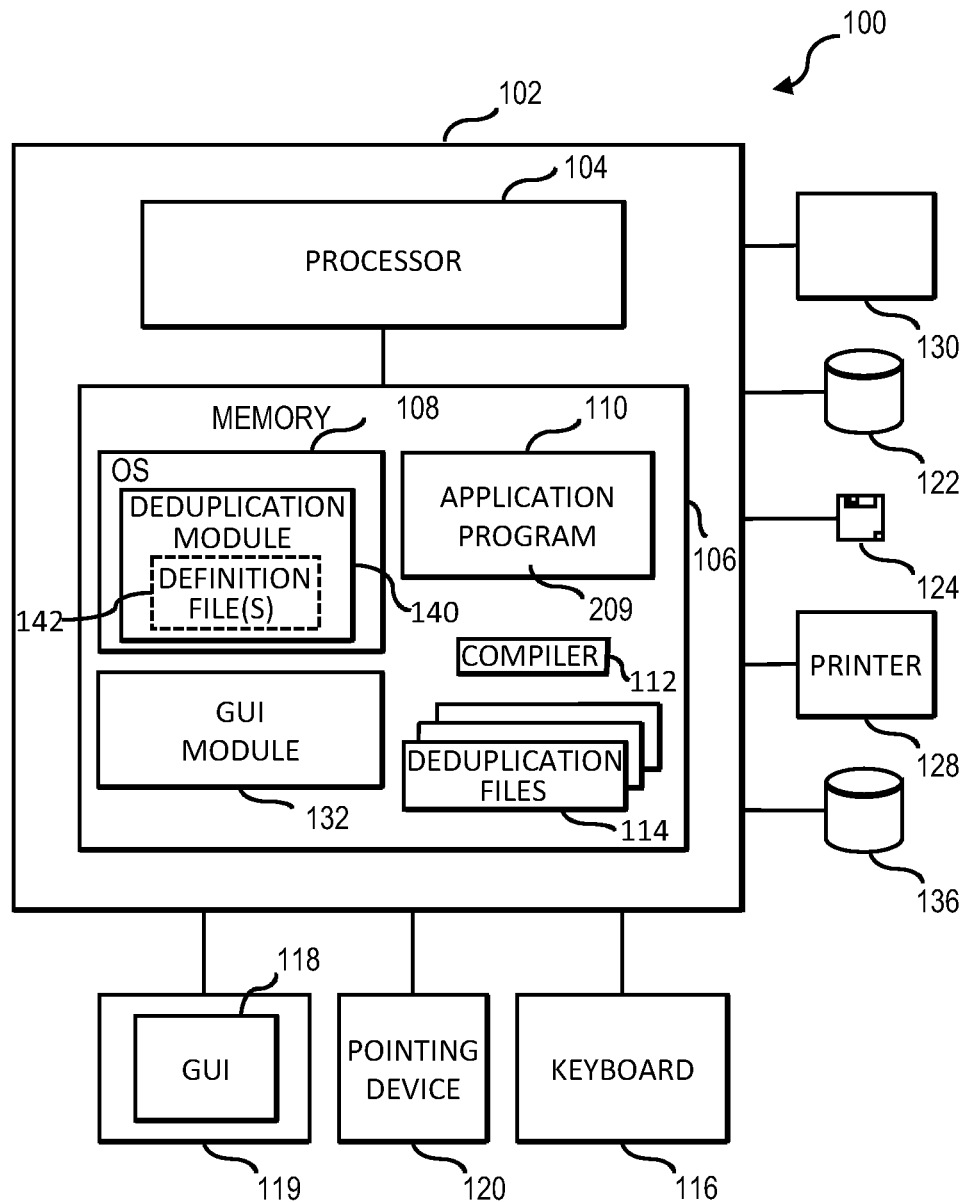
FIG. 1 illustrates an exemplary computing environment in which aspects of the present invention may be implemented.

FIG. 1 hereafter provides an example of computer environment in which the mechanisms of the following embodiments may be implemented. It should be appreciated, however, that FIG. 1 is only exemplary and is not intended to state or imply any limitation as to the particular architectures in which the exemplary aspects of the various embodiments may be implemented. Many modifications to the architecture depicted in FIG. 1 may be made without departing from the scope and spirit of the following description and claimed subject matter.

FIG. 1 illustrates an exemplary computer environment 100 that can be used to implement embodiments of the present invention. The computer 102 comprises a processor 104 and a memory 106, such as random access memory (RAM). The computer 102 is operatively coupled to a display 119, which presents images such as windows to the user on a graphical user interface 118. The computer 102 may be coupled to other devices, such as a keyboard 116, a mouse device 120, a printer 128, etc. Of course, those skilled in the art will recognize that any combination of the above components, or any number of different components, peripherals, and other devices, may be used with the computer 102.

Generally, the computer 102 operates under control of an operating system (OS) 108 (e.g. z/OS, OS/2, LINUX, UNIX, WINDOWS, MAC OS) stored in the memory 106, and interfaces with the user to accept inputs and commands and to present results, for example through a graphical user interface (GUI) module 132. In one embodiment of the present invention, the OS 108 facilitates the backup mechanisms. Although the GUI module 132 is depicted as a separate module, the instructions performing the GUI functions can be resident or distributed in the operating system 108, the computer program 110, or implemented with special purpose memory and processors.

OS 108 includes a deduplication module 140 providing a utility for creating and/or testing one or more deduplication test files. The deduplication module 140 utilizes one or more definition files 142 to create the deduplication test files. Definition file(s) 142 may be customizable by the user through the GUI module 132. Definition file(s) 142 are used to define what file characteristic(s) (or characteristics across multiple files) need be addressed by the deduplication module 149 during deduplication test file creation that will result in one or more specific deduplication factors exhibited when the deduplication test files are processed by a deduplication product. Definition file(s) 142 will be further described, following.

The computer 102 also implements a compiler 112 that allows an application program 110 written in a programming language such as COBOL, PL/1, C, C++, JAVA, ADA, BASIC, VISUAL BASIC or any other programming language to be translated into code that is readable by the processor 104. After completion, the computer program 110 accesses and manipulates data stored in the memory 106 of the computer 102 using the relationships and logic that was generated using the compiler 112.

A deduplication fileset 114 of several deduplication test files as previously described is stored on memory 108. The computer 102 also optionally comprises an external data communication device 130 such as a modem, satellite link, Ethernet card, wireless link or other device for communicating with other computers, e.g. via the Internet or other network.

Data storage device 122 is a direct access storage device (DASD) 122, including one or more primary volumes holding a number of datasets. DASD 122 may include a number of storage media, such as hard disk drives (HDDs), tapes, and the like. Data storage device 136 may also include a number of storage media in similar fashion to device 122. The device 136 may be designated as a backup device 136 for holding backup versions of the number of datasets primarily stored on the device 122. As the skilled artisan will appreciate, devices 122 and 136 need not be located on the same machine. Devices 122 may be located in geographically different regions, and connected by a network link such as Ethernet. Devices 122 and 136 may include one or more volumes, with a corresponding volume table of contents (VTOC) for each volume.

In one embodiment, instructions implementing the operating system 108, the computer program 110, and the compiler 112, as well as the definition file(s) 142 and deduplication fileset 114 are tangibly embodied in a computer-readable medium, e.g., data storage device 120, which may include one or more fixed or removable data storage devices, such as a zip drive, disc 124, hard drive, DVD/CD-ROM, digital tape, etc., which are generically represented as the disc 124. Further, the operating system 108 and the computer program 110 comprise instructions which, when read and executed by the computer 102, cause the computer 102 to perform the steps necessary to implement and/or use the present invention. Computer program 110 and/or operating system 108 instructions may also be tangibly embodied in the memory 106 and/or transmitted through or accessed by the data communication device 130. As such, the terms "article of manufacture," "program storage device" and "computer program product" as may be used herein are intended to encompass a computer program accessible and/or operable from any computer readable device or media.

Embodiments of the present invention may include one or more associated software application programs 110 that include, for example, functions for managing a distributed computer system comprising a network of computing devices, such as a storage area network (SAN). Accordingly, processor 104 may comprise a storage management processor (SMP). The program 110 may operate within a single computer 102 or as part of a distributed computer system comprising a network of computing devices. The network may encompass one or more computers connected via a local area network and/or Internet connection (which may be public or secure, e.g. through a virtual private network (VPN) connection), or via a fibre channel SAN or other known network types as will be understood by those skilled in the art. (Note that a fibre channel SAN is typically used only for computers to communicate with storage systems, and not with each other.) As one skilled in the art will appreciate, however, various additional components of the environment 100 may work individually or in concert to define, initialize, and perform the functionality for facilitating deduplication product testing as will be further described.

In general, and in accordance with the present invention, a utility (comprising hardware, software, firmware, or a combination thereof) may be provided to create multitudes of deduplication test files for use in deduplication product testing. The deduplication test files, when processed through deduplication products (for example, during deduplication product testing) are adapted to exhibit certain predefined, standardized deduplication factors. One of these deduplication factors may be a deduplication ratio. Other deduplication factors, however, are contemplated and are known to the skilled artisan.

The multitudes of deduplication test files are based on one or more definition files. The definition file, as previously explained, defines certain file characteristics addressed by the utility during deduplication test file creation resulting in the expression of the deduplication factor when processed through a deduplication product. The file characteristics may include specific file patterns, file/pattern ratios, and patterns across multiple files in order to create deduplication test files having the desired deduplication factors useful in product testing. In one example, the definitional file defines file characteristics which deduplication algorithms used by a given deduplication product utilize to create a specific deduplication ratio.

A number of examples of file characteristics that may include specific file patterns, file/pattern ratios, and patterns across multiple files are possible. A first example may be an amount of redundant data in the file. The more redundant data in the file, the higher the deduplication ratio that may be expected to achieve. In addition, the operability of the file (whether used on a variety of servers and/or databases versus similar servers and/or databases) may affect the deduplication ratio.

In an additional example, the file characteristics may include a rate of data change in the file. Data deduplication factors are related to the number of changed occurring to the data. Each percentage increase in data change drops the deduplication ratio.

In still an additional example, data compression, or the amount of precompressed data in the file may be a file characteristic. Data compression may be a component in a data reduction algorithm implemented in data deduplication products. Precompressed data in a deduplicated file may increase the deduplication ratio.

Figure 2:
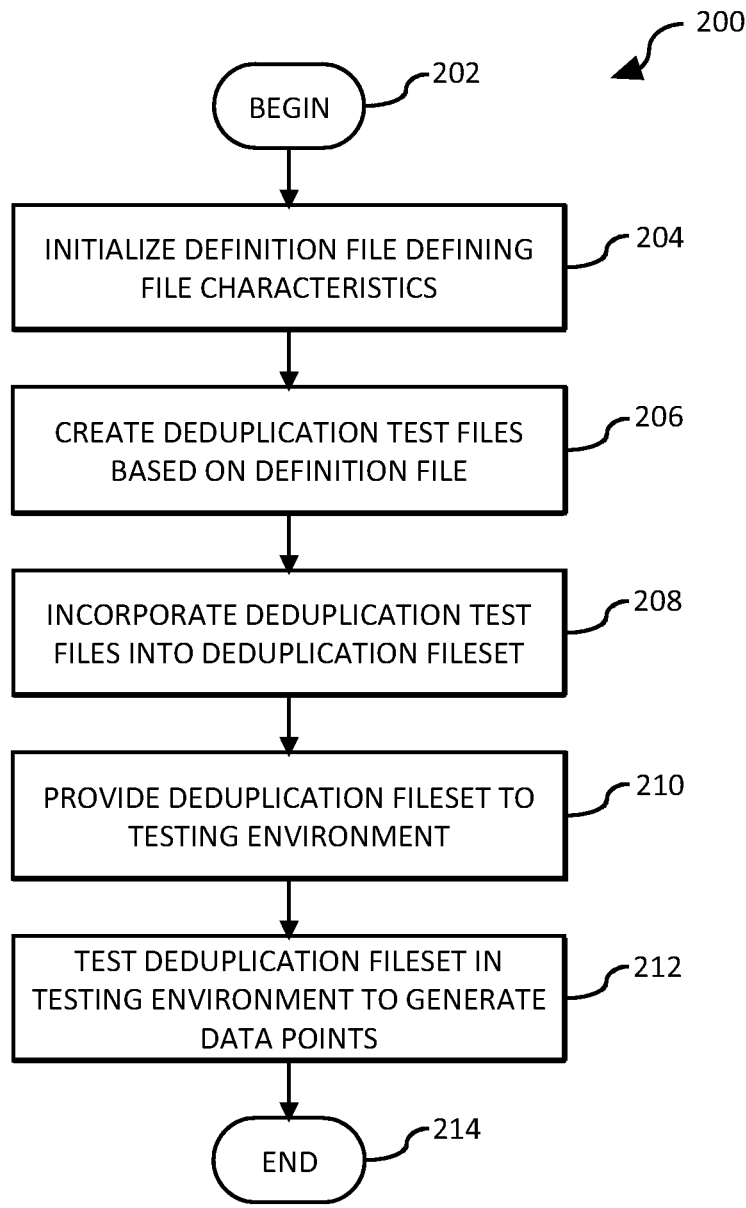
FIG. 2 illustrates an exemplary method for facilitating deduplication product testing in a computing environment in a computing environment.

Turning to FIG. 2, an exemplary method 200 is depicted for facilitating deduplication product testing in a computing environment using the mechanisms of the present invention in a computing environment. As one skilled in the art will appreciate, various steps in the method 200 may be implemented in differing ways to suit a particular application. In addition, the described method may be implemented by various means, such as hardware, software, firmware, or a combination thereof operational on or otherwise associated with the storage environment. For example, the method may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Method 200 begins (step 202) with the initialization of a definition file (step 204) defining one or more file characteristics (or again, characteristics across multiple files) addressable by the utility during file creation resulting in a specific, standardized deduplication factor when the created files are used by the deduplication product in question. Here, as before, defining one or more file characteristics may include defining at least one of a file pattern, a file/pattern ratio, and a pattern across multiple files. Additional file characteristics may be implemented in a particular situation.

Control then moves to step 206, where one or more deduplication test files are created as described above, based on the definition file. Here again, the deduplication test file(s) are adapted for, when processed through the deduplication product testing, exhibiting a predefined deduplication factor. The deduplication test file(s) are incorporated into a deduplication fileset (step 208). The deduplication fileset is provided to a testing environment in the computing environment or elsewhere (step 210). The user may then access the deduplication fileset when testing a particular deduplication product, testing the deduplication fileset in the testing environment to generate data points (step 212) for analysis. The method 200 then ends (step 214).

While method 200 describes one exemplary methodology, the skilled artisan will appreciate that variations to the depicted methodology may be performed. For example, several deduplication filesets may be created using the utility. Each of the deduplication filesets may include multiple deduplication test files exhibiting deduplication factors that vary according to the order in the fileset. One of the filesets may include multiple deduplication test files varying in deduplication ratios. Additional filesets may exhibit other deduplication factors.

Figure 3:
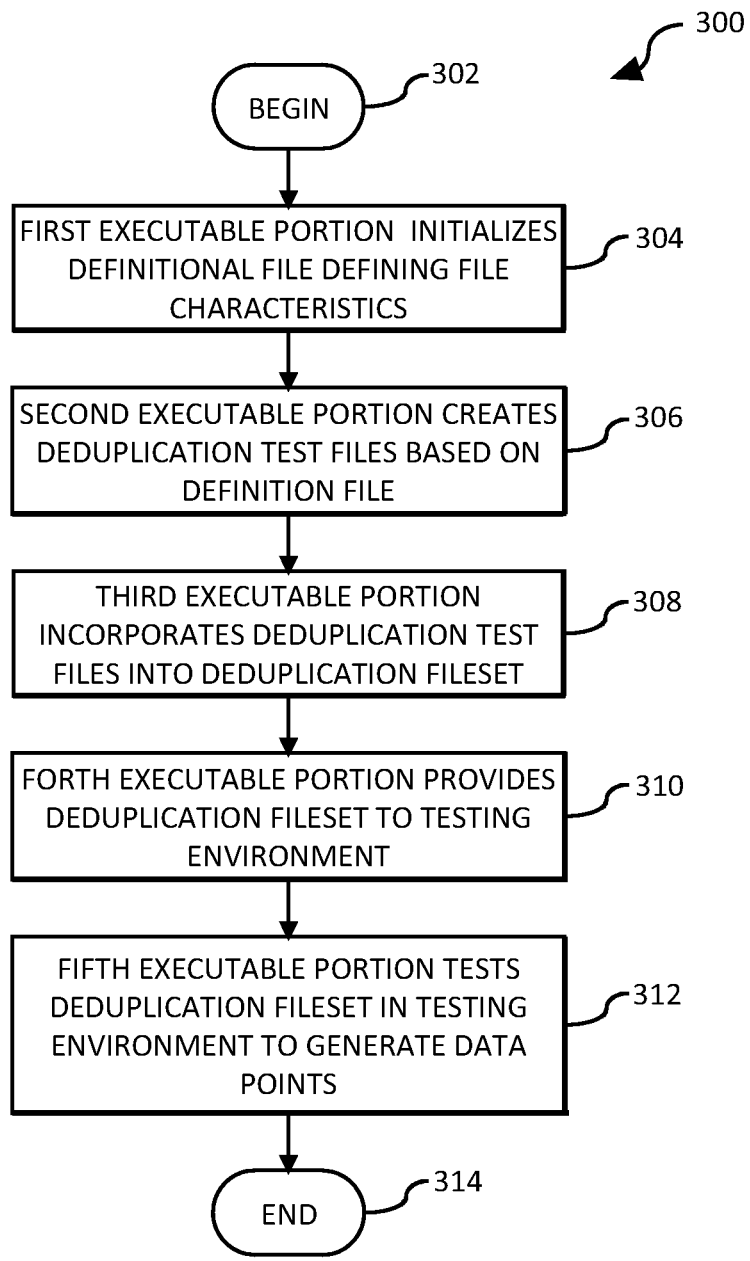
FIG. 3 illustrates an exemplary process for facilitation deduplication product testing as performed by a computer program product.

FIG. 3 illustrates an exemplary process 300 for facilitation deduplication product testing as performed by a computer program product. Process 300 begins 302 with the initialization of a definitional file defining one or more file characteristics as performed by a first executable portion (step 304). A second executable portion creates deduplication test files based on the definition file (step 306).

As a next step, a third executable portion incorporates the deduplication test files into a deduplication fileset (step 308). A fourth executable portion provides the deduplication fileset to a product-testing environment (step 310). A fifth executable portion tests the deduplication fileset in the test environment to generate data points (step 312). The process 300 then ends (step 314).

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, as electronic signals on a system or network.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for facilitating deduplication product testing in a computing environment by a processor in communication with a memory device, comprising:
   initializing a definition file, the definition file defining at least one file characteristic of a file addressed during deduplication test file creation resulting in an expression of a predefined deduplication factor, the at least one file characteristic including at least one of a rate of data change in the file and an amount of precompressed data in the file;
   generating at least one deduplication test file based on the definition file;
   providing the at least one deduplication test file to a testing environment in the computing environment, wherein the at least one deduplication test file is accessed by the testing environment;
   processing the at least one deduplication test file through the deduplication product testing such that the at least one deduplication test file exhibits the predefined deduplication factor;
   incorporating the at least one deduplication test file into a deduplication fileset; and
   testing the deduplication fileset, including the at least one deduplication test file, in the testing environment to generate a plurality of data points corresponding to the predefined deduplication factor.

2. The method of claim 1, wherein the predefined deduplication factor includes a deduplication ratio representative of a ratio of first data before a deduplication operation to second data obtained from the deduplication operation.

3. The method of claim 2, wherein the at least one file characteristic includes at least one of a file pattern, a file/pattern ratio, and a pattern across multiple files.

4. The method of claim 1, wherein the deduplication fileset includes a plurality of additional deduplication test files, each of the plurality of additional deduplication test files exhibiting an additional predefined deduplication factor.

5. The method of claim 4, further including testing the plurality of additional deduplication test files in the testing environment to generate the plurality of data points corresponding to each additional predefined deduplication factor.

6. A utility for facilitating deduplication product testing in a computing environment, comprising:
   a memory device;
   a processor in communication with the memory device, wherein the processor is adapted for:
      initializing a definition file defining at least one file characteristic of a file addressed during deduplication test file creation resulting in an expression of a predefined deduplication factor, the at least one file characteristic including at least one of a rate of data change of the file and an amount of precompressed data in the file;
      generating at least one deduplication test file based on the definition file, providing the at least one deduplication test file to a testing environment in the computing environment, wherein the at least one deduplication test file is accessed by the testing environment;
      processing the at least one deduplication test file through the deduplication product testing such that the at least one deduplication test file exhibits the predefined deduplication factor;
      incorporating the at least one deduplication test file into a deduplication fileset; and
      testing the deduplication fileset, including the at least one deduplication test file, in the testing environment to generate a plurality of data points corresponding to the predefined deduplication factor.

7. The utility of claim 6, wherein the predefined deduplication factor includes a deduplication ratio representative of a ratio of first data before a deduplication operation to second data obtained from the deduplication operation.

8. The utility of claim 6, wherein the at least one file characteristic includes at least one of a file pattern, a file/pattern ratio, and a pattern across multiple files.

9. The utility of claim 6, wherein the deduplication fileset includes a plurality of additional deduplication test files, each of the plurality of additional deduplication test files exhibiting an additional predefined deduplication factor.

10. The utility of claim 9, wherein the processor is further adapted for testing the plurality of additional deduplication test files in the testing environment to generate the plurality of data points corresponding to each additional predefined deduplication factor.

11. The utility of claim 6, wherein the processor comprises a storage management processor responsible for management of a data storage environment associated with the computing environment.

12. A computer program product for facilitating deduplication product testing in a computing environment by a processor in communication with a memory device, the computer program product comprising a non-transitory computer-readable storage medium having computer-readable program code portions stored therein, the computer-readable program code portions comprising:
   a first executable portion for initializing a definition file defining at least one file characteristic of a file addressed during deduplication test file creation resulting in an expression of a predefined deduplication factor, the at least one file characteristic including at least one of a rate of data change of the file and an amount of precompressed data in the file, generating at least one deduplication test file based on the definition file, providing the at least one deduplication test file to a testing environment in the computing environment, wherein the at least one deduplication test file is accessed by the testing environment, processing the at least one deduplication test file through the deduplication product testing such that the at least one deduplication test file exhibits the predefined deduplication factor, incorporating the at least one deduplication test file into a deduplication fileset, and testing the deduplication fileset, including the at least one deduplication test file, in the testing environment to generate a plurality of data points corresponding to the predefined deduplication factor.

13. The computer program product of claim 12, wherein the predefined deduplication factor includes a deduplication ratio representative of a ratio of first data before a deduplication operation to second data obtained from the deduplication operation.

14. The computer program product of claim 12, wherein the deduplication fileset includes a plurality of additional deduplication test files, each of the plurality of additional deduplication test files exhibiting an additional predefined deduplication factor, and the computer program product further includes a second executable portion for testing the plurality of additional deduplication test files in the testing environment to generate the plurality of data points corresponding to each additional predefined deduplication factor.

* * * * *